United States Patent [19]

Perner et al.

[11] Patent Number: 4,981,884

[45] Date of Patent: Jan. 1, 1991

[54] SYNTHETIC RESIN WITH BASIC NITROGEN GROUPS, PREPARATION AND USE THEREOF

[75] Inventors: Thomas Perner, Ludwigshafen; Rolf Osterloh, Erftstadt; Eberhard Schupp, Gruenstadt; Thomas Schwerzel, Ludwigshafen; Klaas Ahlers, Muenster, all of Fed. Rep. of Germany

[73] Assignee: BASF Aktiengesellschaft, Ludwigshafen, Fed. Rep. of Germany

[21] Appl. No.: 210,502

[22] Filed: Jun. 23, 1988

[30] Foreign Application Priority Data

Jun. 25, 1987 [DE] Fed. Rep. of Germany ....... 3720955

[51] Int. Cl.$^5$ ................................................ C08K 3/20
[52] U.S. Cl. ..................................... 523/404; 525/526
[58] Field of Search ........................... 525/526; 523/404

[56] References Cited

U.S. PATENT DOCUMENTS 4,017,438  4/1977  Jerabek et al. .............. 206/29.2 EP
4,557,814 12/1985  Schupp et al. .
4,699,937 10/1987  Loch et al. ........................... 523/415

FOREIGN PATENT DOCUMENTS 3702503  7/1987  Fed. Rep. of Germany .

*Primary Examiner*—Lewis T. Jacobs
*Assistant Examiner*—Karen A. Hellender
*Attorney, Agent, or Firm*—Keil & Weinkauf

[57] ABSTRACT

A synthetic resin which carries basic nitrogen groups and is water-dilutable by protonation with an acid, containing (A) a chain-extended, amine-modified epoxy resin obtainable by reacting ($a_1$) an epoxy resin having an average molecular weight $M_n$ of from 300 to 6,000 and on average from 1.5 to 3.0 epoxy groups per molecule with ($a_2$) a diketimine of a diprimary diamine, which diprimary diamine contains no further groups reactive with epoxy groups under mild conditions and (B) an amino-modified epoxy resin obtainable by reacting $b_1$) an epoxy resin having an average molecular weight $M_n$ of from 800 to 6,000 and on average from 1.5 to 3.0 epoxy groups per molecule with ($b_2$) a secondary amine or a secondary-tertiary diamine, a ketimine of a primary monoamine or a ketimine of a primary/tertiary diamine or a mixture of these ($b_2$) components, with the proviso that (A) and (B) are different.

10 Claims, No Drawings

SYNTHETIC RESIN WITH BASIC NITROGEN GROUPS, PREPARATION AND USE THEREOF

The present invention relates to synthetic resins which carry basic nitrogen groups and are water-dilutable by protonation with acid, and to the preparation and use thereof as a coating agent, in particular for cathodic electrocoating.

Synthetic resins which carry basic nitrogen groups are known. For instance, German Laid-Open Application DOS No. 3,325,061 describes a resin of the abovementioned type, which is obtainable by reacting (A) an epoxy resin having an average molecular weight $M_n$ of from 300 to 6,000 and on average from 1.5 to 3.0 epoxy groups per molecule with (B) a diketimine of a diprimary amine and optionally also with (C) a secondary amine which may contain a tertiary amino group also, a ketimine of a primary monoamine and/or a ketimine of a primary/tertiary diamine.

However, coatings on this basis do not show good corrosion protection in the climate cycling test (German Automotive Industry Association method VDA 621415).

It is an object of the present invention to provide a synthetic resin which carries basic nitrogen groups and is water-dilutable by protonation with acid and which, on protonation and dilution with water, gives stable dispersions and, if used as a binder for cathodically depositable electrocoatings, highly resilient films of good corrosion protection and flow properties.

We have found, surprisingly, that this object is achieved in that the corrosion protection (in particular in the climate cycling test VDA 621415) of the electrocoatings described in German Laid-Open Application DOS No. 3,325,061 is substantially improvable by partially replacing the binders described therein with nonelasticized epoxy resins which have been modified with secondary amines only and thus have only a low basicity and require little acid for dispersion.

The present invention accordingly provides a synthetic resin which carries basic nitrogen groups and is water-dilutable by protonation with an acid, containing (A) a chain-extended, amine-modified epoxy resin obtainable by reacting ($a_1$) an epoxy resin having an average molecular weight $M_n$ of from 300 to 6,000 and on average from 1.5 to 3.0 epoxy groups per molecule with ($a_2$) a diketimine of a diprimary amine and optionally also with ($a_3$) a secondary amine which may contain a tertiary amino group also, a ketimine of a primary monoamine and/or a ketimine of a primary/tertiary diamine and (B) an amine-modified epoxy resin obtainable by reacting ($b_1$) an epoxy resin having an average molecular weight $M_n$ of from 800 to 6,000 and on average from 1.5 to 3.0 epoxy groups per molecule with ($b_2$) a secondary amine which may contain a tertiary amino group also, a ketimine of a primary monoamine and/or a ketimine of a primary/tertiary diamine.

The present invention also provides a synthetic resin, obtainable as described above, which carries basic nitrogen groups, which is water-dilutable by protonation with acid and the hydroxyl groups of which have effectively been at least partly converted with partially blocked polyisocyanate into urethane groups.

The present invention also provides the use of the novel synthetic resin which is water-dilutable by protonation with acid in the form of an aqueous dispersion which may additionally contain crosslinking agents, organic solvents, pigments and/or further auxiliary substances, as a coating agent, in particular for the cathodic electrocoating of electroconductive substrates.

The present invention also provides a coating agent which contains as the binder the synthetic resin with basic nitrogen groups prepared according to the invention and additionally a crosslinking agent.

Similarly, the present invention provides a coated article obtained by application of the novel synthetic resin or coating agent and baking. The coatings thus applied are notable for particularly good corrosion protection in the climate cycling test of VDA 621415, and have the underpenetration at a scribe determined therein is substantially less than that obtained with the binders described in German Laid-Open Application DOS No. 3,325,061.

In what follows, the components of the synthetic resin according to the invention and the preparation thereof will be discussed individually:

Epoxy resin (a1) can be any desired material as long as it has on average molecular weight $M_n$ of from 300 to 6,000 and on average from 1.5 to 3.0 epoxy groups per molecule, preferably two epoxy groups per molecule. Preference is given to epoxy resins having average molecular weights $M_n$ of from 350 to 5,000, in particular of from 350 to 2,000. Particularly preferred epoxy resins are for example glycidyl ethers of polyphenols containing on average at least two phenolic hydroxyl groups per molecule, which are preparable in a conventional manner by etherification with an epihalohydrin in the presence of alkali. Examples of suitable phenol compounds are bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane and 1,5-dihydroxynaphthalene. In some cases it is desirable to use aromatic epoxy resins having a higher molecular weight. These epoxy resins are obtained by reacting the abovementioned diglycidyl ethers with a polyphenol, for example bis(4-hydroxyphenyl)-2,2-propane, and then further reacting the resulting compounds with epichlorohydrin to prepare polyglycidyl ethers.

Another suitable class of epoxy resins comprises polyglycidyl ethers of phenolic novolak resins.

Also suitable are polyglycidyl ethers of polyhydric alcohols, such as ethylene glycol, diethylene glycol, triethylene glycol, 1,2-propylene glycol, 1,3-propanediol, 1,5-pentanediol, 1,2,6-hexanetriol, glycerol and bis(4-hydroxycyclohexyl)-2,2-propane.

It is also possible to use polyglycidyl esters of polycarboxylic acids.

Of the polyphenol polyglycidyl ethers preferred according to the invention, those having epoxy equivalent weights within the range from 180 to 1,000 are particularly preferred.

Aromatic polyepoxides having a higher epoxy equivalent weight can be prepared from those having a lower epoxy equivalent weight and polyphenols before or during the reaction with components (b) and (c).

The diketimines of primary diamines (a₂) can be ketimines of any desired ketones with any desired primary diamines. Such ketimines are easily obtainable from ketones and primary diamines by removal of the water of reaction, for example by azeotropic distillation.

Suitable primary diamines are for example those which contain no further groups reactive with epoxy groups under mild conditions. For example, they must not contain any secondary amino groups or mercaptan groups, while alcoholic hydroxyl groups are too inert to interfere. Examples of suitable primary diamines are ethylenediamine, 1,3-diaminopropane, 1,4-diaminobutane, 1,6-diaminohexane, 4,9-dioxadodecane-1,12-diamine, 4,4'-diaminodicyclohexylmethane, 9-aminomethylstearylamine, 2-(3-aminopropyl)cyclohexylamine and also branched diamines, for example 2-methylpentanediamine and 2-ethylbutanediamine.

Besides such polyamines of low defined molecular weight it is also possible to use oligomeric or polymeric polyamines having average molecular weights $M_n$ of up to 3,000. Examples of such polyamines are diamines which are preparable by reductive cyanoethylation of polyols, such as polytetrahydrofuran. Such products contain terminal primary amino groups in the form of aminopropoxy groups.

According to the invention, it is also possible to use diamines having additional amide groups, as obtained for example by condensing primary aliphatic or cycloaliphatic diamines with dicarboxylic acids, such as adipic acid, sebacic acid or dimeric fatty acid. The amines described above can be used alone or mixed with one another.

Suitable ketones are in particular those which, aside from the keto group, contain no further group reactive toward a primary amino group. Examples of suitable ketones are acetone, methyl ethyl ketone, methyl propyl ketone, methyl isopropyl ketone, methyl isobutyl ketone, methyl isoamyl ketone, diethyl ketone, dipropyl ketone and cyclohexanone. Particularly preferred ketones are acetone, methyl ethyl ketone and methyl isobutyl ketone.

Optional secondary amines (a₃) can be any desired nonaromatic amines, for example dialkylamines such as dimethylamine, diethylamine, dipropylamine or dibutylamine. However, preference is given to alkanolamines, for example methylethanolamine, ethylethanolamine, diethanolamine, methylisopropanolamine, ethylisopropanolamine and diisopropanolamine. Suitable secondary amines (a₃) are also those which additionally have a tertiary amino group, for example N,N-diethyl-N'-isobutylpropylene-1,3-diamine and N,N-bis(2-hydroxyethyl)-N'-isobutylpropylene-1,3-diamine.

In some cases it can be advantageous to use as component (a₃) in addition ketimines of primary monoamines. It is in particular ketimines of long-chain primary monoamines, for example octylamine, laurylamine or stearylamine, or amide-amines of primary diamines and monocarboxylic acids, such as ethylhexanoic acid or higher fatty acids, which can be used for plasticizing the coatings prepared from the synthetic resin according to the invention.

Finally, it is also possible to use monoketimines of primary/tertiary diamines as component (a₃). Examples thereof are the ketimines of N,N-diethylethylenediamine and of N,N-diethylpropylene-1,3-diamine. These amines are more easily obtainable than the abovementioned secondary/tertiary diamines, and via their ketimines it is possible to incorporate additional basic groups in the resin.

The mixing ratios of components (a₁), (a₂) and if used (a₃) are variable within wide limits. For most of the purposes according to the invention it is desirable to prepare synthetic resins containing no epoxy groups, ie. the number of epoxy equivalents of epoxy resin (a₁) used is preferably from 50 to 100% of the sum of the ketimine and secondary amine equivalents used of components (a₂) and (a₃). In the case of products which contain no component (a₃), the molecular weight of the synthetic resin according to the invention is regulated via the equivalent ratio between epoxy groups and ketimine groups. The number of epoxy resins used of epoxy resin (a₁) is then particularly preferably from 50 to 70% of the ketimine equivalents used of component (a₂). If component (a₃) is used in addition, the obtainable molecular weight is additionally limited by the amount of (monofunctional) component (a₃). As a result it is also possible to make the total amount of the equivalents of (a₂) and (a₃) used equal to the equivalents of (a₁).

The average molecular weight $M_n$ of the synthetic resin (A) according to the invention should be from about 1,000 to 10,000; for many purposes, for example for the preparation of cataphoretically depositable waterborne paint systems, average molecular weights $M_n$ of from 1,500 to about 5,000 are desirable.

Epoxy resins (b₁) can be materials which have an average molecular weight $M_n$ of from 800 to 6,000 and on average contain from 1.5 to 3.0 epoxy groups per molecule, preferably compounds having two epoxy groups per molecule and also aromatic groups. Particular preference is given to epoxy resins having average molecular weights $M_n$ of from 850 to 3,000, for example glycidyl ethers of polyphenols containing on average at least two phenolic hydroxyl groups per molecule, which are preparable in a conventional manner by etherification with an epihalohydrin in the presence of alkali. Examples of suitable phenol compounds are bis(4-hydroxyphenyl)-2,2-propane, 4,4'-dihydroxybenzophenone, bis(4-hydroxyphenyl)-1,1-ethane, bis-(4-hydroxyphenyl)-1,1-isobutane, bis(2-hydroxynaphthyl)methane and 1,5-dihydroxynaphthalene. Aromatic epoxy resins having a higher molecular weight are obtained by reacting the abovementioned diglycidyl ethers with a polyphenol, for example bis(4-hydroxyphenyl)-2,2-propane, and then further reacting the resulting compounds with epichlorohydrin to prepare polyglycidyl ethers.

Secondary amines (b₂) can be any desired nonaromatic amines, for example dialkylamines such as dimethylamine, diethylamine, dipropylamine or dibutylamine. However, preference is given to alkanolamines, for example methylethanolamine, ethylethanolamine, diethanolamine, methylisopropanolamine, ethylisopropanolamine and diisopropanolamine. Suitable secondary amines (b₂) are also those which additionally have a tertiary amino group, for example N,N-diethyl-N'-isobutylpropylene-1,3-diamine and N,N-bis(2-hydroxyethyl)-N'-isobutylpropylene-1,3-diamine.

In some cases it can be advantageous to use as component (b₂) in addition ketimines of primary monoamines, in particular ketimines of long-chain primary monoamines, eg. octylamine, laurylamine or stearylamine.

Finally, it is also possible to use monoketimines of primary/tertiary diamines as component (b₂). Examples thereof are the ketimines of N,N-diethylethylenediamine and of N,N-diethylpropylene-1,3-diamine. These amines are more easily obtainable than the abovementioned secondary/tertiary diamines, and via their ketimines it is possible to incorporate additional basic groups in the resin.

The mixing ratios of components (b₁) and (b₂) can be varied to the extent that the ratio of the epoxy equivalents used of epoxy resin (b₁):the secondary amine or ketimine equivalents (b₂) used is from 0.9 to 1.1, the stoichiometric reaction being preferred.

The average molecular weight $M_n$ of novel synthetic resin (B) should be from about 900 to 10,000; for many purposes, for example for the preparation of cataphoretically depositable waterborne paint systems, average molecular weights $M_n$ of from 900 to about 5,000 are desirable.

The preparation of components (A) and (B) is advantageously carried out in the presence of solvents, for example hydrocarbons such as toluene or xylene, ketones, such as methyl ethyl ketones or methyl isobutyl ketone, alcohols such as ethanol or butanol, esters, ethers or the like, at from 50° to 150° C., preferably at from 80° to 130° C.

The mixing ratios of resin components (A) and (B) are variable within wide limits. The proportion of component (B), based on the total mixture of (A) and (B), can be from 10 to 80% by weight, the range from 20 to 70% by weight being preferred. Particular preference is given to the range from 30 to 50% by weight.

The synthetic resin according to the invention, following the treatment with water, contains hydroxyl groups, secondary amino groups and, in addition, primary and/or tertiary amino groups. It is therefore capable of a large number of crosslinking reactions, which, following admixture of suitable crosslinking agents, makes it a useful binder for coatings.

Suitable crosslinking agents for the binder according to the invention are for example aminoplast resins, such as urea-formaldehyde resins, melamine resins or benzoguanamine resins, phenoplast resins, blocked isocyanate crosslinking agents, crosslinking agents which act via esteraminolysis and/or transesterification and have an average of at least two activated ester groups per molecule, for example β-hydroxyalkyl ester crosslinking agents as described in EP No. 0,040,867 and carbalkoxymethyl ester crosslinking agents, urea condensation products, as obtained for example from primary diamines and/or polyamines, secondary monoamines and urea, in the presence or absence of a polyalcohol, for example trimethylolpropane, and β-hydroxyalkyl carbamate crosslinking agents as obtained for example by reacting polyprimary amines with ethylene carbonate. The amount of crosslinking agent to be used depends on the nature and number of groups to be reacted with one another in the synthetic resin and the crosslinking agent and on the crosslinking density desired. In general, synthetic resin:crosslinking agent ratios of from 1:9 to 9:1, preferably from 1:1 to 9:1, in particular from 1.5:1 to 4:1, each based on the weight, are used.

It is not absolutely necessary to add separate crosslinking agents since crosslinking agent functions can also be incorporated in the synthetic resin according to the invention, so that it becomes self-crosslinking. This can be effected for example by reacting the resulting resin (A) and (B) with a partially blocked polyisocyanate which on average still contains about one free isocyanate group in the molecule. The capping agents used on the polyisocyanate can be for example alcohols, phenols and oximes. A further way of rendering the synthetic resin according to the invention self-crosslinking consists in introducing β-hydroxyalkyl carbamate groups. To this end the ketone is first eliminated by hydrolysis from the resin according to the invention. The resulting primary amino groups are then for example converted with ethylene carbonate into β-hydroxyethyl carbamates.

Aside from crosslinking agents it is also possible to add further substances such as pigments, assistants, solvents and curing catalysts. The coating agents thus prepared can be applied in a conventional manner, such as spraying, dipping, casting or knife coating, to substrates such as wood, plastic or metal. The coatings are cured, depending on the crosslinking agent, at from 120° to 210° C. in the course of from about 5 to 40 minutes, the lowest baking temperature requiring the longest baking time.

The amine numbers of the synthetic resins according to the invention are within the range from about 50 to 300 mg of KOH/g. They are therefore convertible, even if in admixture with the abovementioned crosslinking agents, by complete or partial protonation of the amino groups into aqueous dispersions which are advantageously suitable for the electrocoating of electroconductive substrates, for example metal parts. To this end a neutralizing agent, for example formic acid, acetic acid, lactic acid or phosphoric acid, is stirred in, followed by dilution with water to the processing concentration.

For cathodic electrocoating the solids content of an electrocoating bath is generally set to from 5 to 30% by weight. Deposition customarily takes place at from 15° to 40° C. for from 0.5 to 5 minutes at a pH of from 4.0 to 8.5, preferably pH 5.0–7.5, in general at deposition voltages of from 50 to 500 volts, with the electroconductive article to be coated connected as the cathode. The deposited film is cured at above 120° C. in the course of about 20 minutes.

I. Preparation of ketimines

Component 1

In a reaction vessel, 232 g of hexamethylenediamine, 290 g of dimerized fatty acid and 40 g of xylene were heated to 190° C. and maintained at that temperature for one hour during which 29 g of an aqueous phase were separated off. Amine determination showed that the phase consisted of 18 g of water and 11 g of hexamethylenediamine. 11 g of hexamethylenediamine and 621 g of methyl isobutyl ketone were added to the batch, and 54 g of water were distilled off under reflux. The product had an amine number of 155 mg of KOH/g and contained 30% by weight of solvent.

Component 2

387 g of hexamethylenediamine, 580 g of dimeric fatty acid and 97 g of linseed oil acid were heated at 190° C. for 2 hours during which 48 g of an aqueous phase were separated off with 80 g of xylene.

696 g of the condensate left behind were admixed with 552 g of methyl isobutyl ketone, and 44 g of water were distilled off. The product had an amine number of 122 mg of KOH/g and a solvent content of 30% by weight.

Component 3

In a reaction vessel, 651.0 g of diethylaminopropylamine and 853.7 g of methyl isobutyl ketone were refluxed with the distillative removal of water until 85 g of water had been separated off. The product had an amine number of 420 mg of KOH/g and a solvent content of 25% by weight.

II. Preparation of synthetic resin (A)

Component A1

207.9 g of a diglycidyl ether of bis(4-hydroxyphenyl)-2,2-propane and epichlorohydrin having an equivalent weight of 485 and 54.3 g of an analogous diglycidyl ether having an equivalent weight of 190 were heated to the reflux point together with 60 g of toluene to remove traces of water present. 210.9 g of component 1 and 22.5 g of diethanolamine were then added and the mixture was heated to 120° C. 5 hours later epoxy was no longer detectable. The mixture was diluted with 11.8 g of butylglycol and 50 g of isobutanol. The product had a solids content of 65% by weight.

Component A2

214.3 g of a diglycidyl ether of bis(4-hydroxyphenyl)-2,2-propane and epichlorohydrin having an equivalent weight of 189, 48 g of bis(4-hydroxyphenyl)-2,2propane, 210.9 g of component 2, 3.22 g of methylethanolamine and 18 g of diethanolamine were mixed and maintained at 85° C. for 90 minutes and then at 100° C. for a further 90 minutes. The mixture was then diluted with 14.3 g of butylglycol and 107 g of isobutanol to a solids content of 65% by weight.

III. Preparation of synthetic resin (B)

Component B1

121.3 g of a diglycidyl ether of bis(4-hydroxyphenyl)-2,2-propane and epichlorohydrin having an equivalent weight of 485 and 26.3 g of diethanolamine were dissolved in 26.0 g of toluene and 26.0 g of isobutanol and heated to 100° C. After about 2 hours, epoxy groups were no longer detectable. The product had a solids content of 74% by weight.

Component B2

227.0 g of a diglycidyl ether of bis(4-hydroxyphenyl)-2,2-propane and epichlorohydrin having an equivalent weight of 908 and 26.3 g of diethanolamine were dissolved in 48.7 g of toluene and 48.7 g of isobutanol and heated to 100° C. After about 2 hours, epoxy groups were no longer detectable. The product had a solids content of 72% by weight.

Component B3

445.3 g of a diglycidyl ether of bis(4-hydroxyphenyl)-2,2-propane and epichlorohydrin having an equivalent weight of 1,781 and 26.3 g of diethanolamine were dissolved in 95.4 g of toluene and 95.4 g of isobutanol and heated to 100° C. After about 2 hours, epoxy groups were no longer detectable. The product had a solids content of 71% by weight.

Component B4

121.3 g of a diglycidyl ether of bis(4-hydroxyphenyl)-2,2-propane and epichlorohydrin having an equivalent weight of 485, 13.1 g of diethanolamine and 8.4 g of component 3 were dissolved in 26.0 g of toluene and 26.0 g of isobutanol and heated to 120° C. After about 4 hours, epoxy groups were no longer detectable. The product had a solids content of 72% by weight.

Component B5

227.0 g of a diglycidyl ether of bis(4-hydroxyphenyl)-2,2-propane and epichlorohydrin having an equivalent weight of 908, 13.1 g of diethanolamine and 8.4 g of component 3 were dissolved in 48.7 g of toluene and 48.7 g of isobutanol and heated to 120° C. After about 4 hours, epoxy groups were no longer detectable. The product had a solids content of 71% by weight.

Component B6

445.6 g of a diglycidyl ether of bis(4-hydroxyphenyl)-2,2-propane and epichlorohydrin having an equivalent weight of 1,781, 13.1 g of diethanolamine and 8.4 g of component 3 were dissolved in 95.4 g of toluene and 95.4 g of isobutanol and heated to 120° C. After about 4 hours, epoxy groups were no longer detectable. The product had a solids content of 71% by weight.

IV Preparation of crosslinking agent components

Component C1

504 g of trimerized hexamethylene diisocyanate were dissolved in 382 g of methyl isobutyl ketone. 388 g of dibutylamine were added dropwise at 70° C. with cooling. Stirring was continued until the isocyanate content was almost zero. The product had a solids content of 70% by weight.

Component C2

1,340 g of trimethylolpropane, 3,600 g of urea, 3,870 g of dibutylamine, 1,740 g of hexamethylenediamine and 3,570 g of 3,3'-dimethyl-4,4'-diaminodicyclohexylmethane were slowly heated up. 120° C. saw the elimination of ammonia, and the urea dissolved. The temperature was raised to 155° C. in the course of 2 hours of vigorous refluxing during which large amounts of a crystalline precipitate were produced. Following a further 5 hours under reflux the precipitate had redissolved and the temperature had risen to 165° C. 3,870 g of dibutylamine were then added dropwise in the course of 2 hours, and afterwards heating was continued at 185° C. for 8 hours. 3,600 g of dibutylamine were then distilled off at that temperature under reduced pressure, and after the residue had cooled down to 130° C. it was diluted with 5,170 g of toluene. The product was a colorless viscous liquid having a solids content of 70% by weight.

Component C3

The method of Example 2d) of EP No. 0,040,867 was followed to prepare a polyester crosslinking agent: 192 g of trimelittic anhydride and 500 g of glycidyl versatate having an epoxy equivalent weight of 250 were mixed, and the mixture was heated with stirring to 100° C. An exothermic reaction appeared, and the temperature rose to 190° C. After cooling down to 140° C., 2 g of benzyldimethylamine were added. The mixture was maintained at 140° C. for 3 hours. The result was a viscous, clear product which was diluted with toluene to a solids content of 70% by weight.

V. Preparation of dispersions

Components (A), (B) and (C) were mixed in the ratios stated below, and glacial acetic acid was added. A dispersion was then prepared with stirring by the slow addition of water.

| Dispersion of Example | Component A [g] | Component B [g] | Component C [g] | Glacial acetic acid [g] | Water [g] |
|---|---|---|---|---|---|
| 1[1] | 915.0 (A1) | — | 322 (C2) | 20.0 | 4109 |
| 2[1] | 915.0 (A2) | — | 322 (C2) | 20.0 | 4109 |
| 3 | 640.0 (A2) | 233.3 (B1) | 322 (C2) | 15.4 | 4155 |
| 4 | 640.8 (A2) | 233.3 (B4) | 322 (C2) | 15.4 | 4155 |
| 5 | 640.8 (A2) | 233.3 (B2) | 322 (C2) | 15.4 | 4155 |
| 6 | 457.7 (A2) | 388.9 (B2) | 322 (C2) | 15.4 | 4182 |
| 7 | 640.8 (A2) | 233.3 (B5) | 322 (C2) | 15.4 | 4155 |
| 8 | 457.7 (A2) | 388.9 (B5) | 322 (C2) | 15.4 | 4182 |
| 9 | 640.8 (A2) | 233.3 (B2) | 322 (C1) | 15.4 | 4155 |
| 10[2] | 640.8 (A2) | 233.3 (B2) | 322 (C3) | 15.4 | 4155 |
| 11 | 640.8 (A2) | 233.3 (B3) | 322 (C2) | 15.4 | 4155 |
| 12 | 457.7 (A2) | 388.9 (B6) | 322 (C2) | 15.4 | 4182 |

[1] Comparative examples: stable dispersions were obtained only with larger amounts of acetic acid
[2] the addition of water was preceded by the addition of 16.1 g of lead octoate (25% of Pb).

VI. Preparation of pigmented electrocoating baths
Pigment paste: 525.8 g of component A2 were admixed with 168.7 g of butylglycol, 600 g of water and 16.5 g of acetic acid. 800 g of titanium dioxide, 11.0 g of carbon black and 50 g of basic lead silicate were then added. The mixture was ball milled to a particle size of less than 9 μm. Water was then added to adjust the solids content to 49% by weight.

Electrocoating baths:
The particular dispersion was admixed with 968 g of the pigment paste. The baths were stirred at 28° C. for 120 hours. Zinc-phosphatized steel test panels in cathode connection were coated with paint films deposited at the stated voltage in the course of 120 seconds and were baked at 170° C. for 20 minutes. The following table shows the results:

Results of paint test: Layer thickness 20 μm

| Dispersion | pH | Voltage [V] | Indentation[3] [Nm] | Paint surface[1] | Climate cycling test of VDA 621415 (underpenetration at scribe) |
|---|---|---|---|---|---|
| 1 | 7.2 | 310 | 18.08 | 1–2 | 3.5 mm |
| 2 | 7.3 | 300 | 18.08 | 1 | 3.0 mm |
| 3 | 7.1 | 320 | 18.08 | 1 | 1.5 mm |
| 4 | 7.3 | 310 | 18.08 | 1 | 1.4 mm |
| 5 | 7.0 | 310 | 18.08 | 1 | 1.0 mm |
| 6 | 6.8 | 300 | 18.08 | 1–2 | 0.8 mm |
| 7 | 7.3 | 310 | 18.08 | 1 | 1.1 mm |
| 8 | 7.1 | 300 | 18.08 | 1–2 | 1.0 mm |
| 9 | 7.1 | 310 | 18.08 | 1 | 1.0 mm |
| 10 | 7.0 | 320 | 18.08 | 1–2 | 0.9 mm |
| 11 | 6.9 | 300 | 15.82 | 1–2 | 0.8 mm |
| 12 | 6.7 | 290 | 15.82 | 1–2 | 0.6 mm |

[1] Assessment on a scale where 1 = very good and 6 = inadequate
[2] In addition strong blistering at scribe
[3] The indentation was determined with a mandrel impact tester in accordance with ASTM D 2794.

We claim:

1. A synthetic resin which carries basic nitrogen groups and is water-dilutable by protonation with an acid, containing.
   (A) a chain-extended, amine-modified epoxy resin obtainable by reacting
      (a1) an epoxy resin having an average molecular weight $M_n$ of from 300 to 6,000 and on average from 1.5 to 3.0 epoxy groups per molecule with
      (a2) a diketimine of diprimary diamine, which diprimary diamine contains no further groups reactive with epoxy groups under mild conditions
   and
   (B) an amino-modified epoxy resin obtainable by reacting
      (b1) an epoxy resin having an average molecular weight $M_n$ of from 800 to 6,000 and on average from 1.5 to 3.0 epoxy groups per molecule with
      (b2) a secondary amine or a secondary-tertiary diamine, a ketimine of a primary monoamine or a ketimine of a primary/tertiary diamine or a mixture of these (b2) components,
   with the proviso that (A) and (B) are different.

2. A synthetic resin as defined in claim 1 containing components (A) and (B) whose hydroxyl groups have been at least partly converted with partially blocked polyisocyanate into urethane groups.

3. A synthetic resin as defined in claim 1 containing a component (A), obtained from 1 to 2 equivalents of ketimines and secondary amines of components (a2) and (a3) respectively per epoxy equivalent of epoxy resin (a1).

4. A synthetic resin as defined in claim 1 containing a component (A) prepared using as epoxy resin (a1) a glycidyl ether of a polyphenol which contains on average at least two phenolic hydroxyl groups per molecule and has an average molecular weight $M_n$ of from 350 to 5,000.

5. A synthetic resin as defined in claim 1 containing a component (B) prepared using a ratio of epoxy equivalents of epoxy resin (b1) used: secondary amine and ketimine equivalents (b2) used of from 0.9 to 1.1.

6. A synthetic resin as defined in claim 1 containing a proportion of the component (B), based on the total mixture of A and B, of from 10 to 80% by weight.

7. An aqueous dispersion which may also contain a crosslinking agent, an organic solvent, a pigment and/or further auxiliary substances, obtainable by protonating a water-dilutable synthetic resin as defined in claim 1 with an acid.

8. A coating agent containing as the binder a synthetic resin as defined in claim 1 and additionally a crosslinking agent.

9. A coated article obtainable using a coating agent as defined in claim 8.

10. A synthetic resin as defined in claim 1, wherein components (a1) and (a2) are further reacted with (a3) a secondary amine or a secondary/tertiary amine, a ketimine of a primary monoamine or a ketimine of a primary tertiary diamine or a mixture of these components in forming resin (A).

* * * * *

UNITED STATES PATENT AND TRADEMARK OFFICE
CERTIFICATE OF CORRECTION

PATENT NO.  : 4,981,884
DATED       : January 1, 1991
INVENTOR(S) : Thomas PERNER et al.

It is certified that error appears in the above-identified patent and that said Letters Patent is hereby corrected as shown below:

On the title page:

The Assignee should read --BASF Lacke + Farben Aktiengesellschaft
4400 Muenster
Federal Republic of Germany--

Column 10, line 5, claim 10

"primary tertiary diamine" should read

--primary/tertiary diamine--

Signed and Sealed this

Sixteenth Day of February, 1993

Attest:

STEPHEN G. KUNIN

Attesting Officer

Acting Commissioner of Patents and Trademarks